C. T. HENDERSON.
VEHICLE CONTROLLER.
APPLICATION FILED DEC. 13, 1913.
1,238,910.
Patented Sept. 4, 1917.
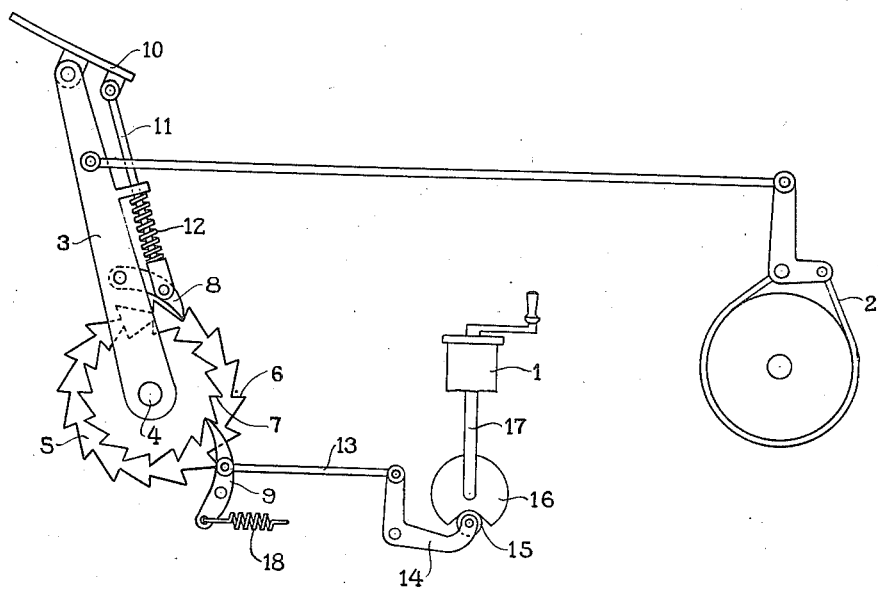
Witnesses
J. L. Johnson
S. A. Watson
Inventor
Clark T. Henderson
By Elwin Bottower Jr.
Attorney

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

VEHICLE-CONTROLLER.

1,238,910.   Specification of Letters Patent.   Patented Sept. 4, 1917.

Application filed December 13, 1913. Serial No. 806,395.

*To all whom it may concern:*

Be it known that I, CLARK T. HENDERSON, a citizen of the United States, residing at Milwaukee, in the county of Milwaukee and State of Wisconsin, have invented new and useful Improvements in Vehicle-Controllers, of which the following is a full, clear, concise, and exact description, reference being had to the accompanying drawing, forming a part of this specification.

This invention relates to controllers for electric vehicles and the like.

Such vehicles are commonly equipped with mechanical brakes adapted to be set and locked, and it frequently occurs that a careless operator will set and lock the brakes without first setting the power controller in an "off" or some other safe position. This, of course, is very undesirable and apt to prove exceedingly dangerous should the brakes be accidentally released or released without realization of the circuit conditions.

This invention has among its objects to provide means for insuring against setting and locking of the brakes of such vehicles without a first setting of the controller in "off" position, or some other safe position.

A further object is to provide means for the aforesaid purpose which will allow use of the brakes while the power controller is in a running position.

Various other objects and advantages of the invention will hereinafter appear.

In practice, the invention may be embodied in various different forms, such as that schematically illustrated in the accompanying drawing which embodiment is particularly applicable to electric vehicles.

The drawing shows schematically a power controller 1 which it may be assumed is an electrical controller, a conventional form of brake 2 and a foot lever 3 for operation of the brake together with one form of interlocking means for the brake lever and controller.

Referring first to the foot lever, the same is pivoted upon a spindle 4 and has associated therewith an independently movable rack disk 5 also mounted upon said spindle 4. The lever 3 is movable to the left to apply the brake 2 and to the right to release said brake. The disk 5 has on its periphery two sets of oppositely disposed rack teeth 6 and 7 preferably arranged side-by-side and extending entirely around said disk. The teeth 6 are arranged to be engaged by a pivoted pawl 8 carried by the lever 3 while the teeth 7 are arranged to be engaged by a fixed pivoted pawl 9. The arrangement is such that the pawl 8 and teeth 6 lock the lever against clockwise movement relative to the disk while the pawl 9 when in engagement with the teeth 7 locks the disk against clockwise movement. Thus, with the disk 5 locked as just described against clockwise movement, it acts as a locking rack for the lever 3 to maintain the brake applied. The release of the lever from the rack may be accomplished in various different ways, as by the provision on said lever of a pivoted foot plate 10 and a connection 11 between said foot plate and pawl 8. With this arrangement a spring 12 is preferably provided to yieldingly press the pawl into engagement with the locking teeth.

As will now be described, if the pawl 9 is withdrawn from engagement with the teeth 7 both the disk 5 and the lever 3 will be freed and accordingly the brake will be released. Consequently, so long as the pawl 9 is held out of engagement with the teeth 7, the lever 3 cannot be locked in braking position. The pawl 9, as will now be described, is governed by the master controller in such a manner as to lock the disk 5 only in a predetermined position of said controller. In all other positions of the controller the pawl 9 is maintained out of engagement with the teeth 7. To this end the pawl 9 is connected by link 13 to a bell-crank lever 14 carrying at one end a roller 15 coöperating with a cam 16 movable with the controller 1 through any suitable connection 17. The cam 16 is of such form as to positively withdraw the pawl 9 from holding position through the medium of the bell crank lever, when the controller is in any but a predetermined position. When, however, the controller is in said predetermined position, the roller on the bell crank lever enters a notch in the cam which frees the pawl 9 for engagement with the teeth 7, the pawl being provided with a spring 18 to effect this engagement.

Thus, assuming that the roller on the bell crank only enters the notch in the cam when the controller is in position to completely cut off the power, it will be seen that the lever 3 can only be locked after first setting of the controller in said position and that it cannot be locked in any running position of the controller. On the other hand, the lever 3 is free for operation to apply the brakes irrespective of the position of the controller 1 so that in running no inconvenience whatever is caused by the aforesaid protective means.

Further, the arrangement enables release of the brake either by tilting of the foot plate, as above set forth, or by merely operating the controller. In the latter event one operation is eliminated in starting. Still further, the arrangement enables the vehicle to be started by the foot lever if desired. This may be readily accomplished by holding the foot lever, then setting the controller in the desired position and finally releasing the foot lever.

It should, of course, be understood that various modifications may be made in the arrangement illustrated without departing from the scope of the appended claims.

What I claim as new and desire to secure by Letters Patent is:

1. In an electric vehicle, in combination, a pivoted brake operating lever, a ratchet member pivoted co-axially with said lever but rotatable independently thereof, a pawl carried by said lever and coöperable with said member to lock the latter against relative movement in one direction, a second pawl coöperable with said member to lock the latter against movement in the other direction, and a power controller for the vehicle acting through said second pawl to lock and release said member.

2. In an electric vehicle, in combination, a pivoted brake lever, a co-axially pivoted but independently rotatable disk associated therewith, said disk having two sets of oppositely disposed ratchet teeth, a pawl carried by said lever and coöperable with one set of said ratchet teeth to lock said lever against movement relative to said disk in one direction, a second pawl coöperable with the other set of ratchet teeth to lock said disk against movement in the same direction, and a circuit controller for the vehicle governing said second pawl and operable to effect locking of said disk thereby only when the supply circuit of the vehicle is interrupted.

In witness whereof, I have hereunto subscribed my name in the presence of two witnesses.

CLARK T. HENDERSON.

Witnesses:
H. A. SEDGWICK,
ELIZABETH C. HAHEN.